United States Patent
Mollon et al.

(10) Patent No.: US 9,567,921 B2
(45) Date of Patent: Feb. 14, 2017

(54) METHOD AND DEVICE FOR SAVING THE OPERATION OF A VEHICLE

(71) Applicants: RENAULT s.a.s., Boulogne Billancourt (FR); NISSAN MOTOR CO. LTD., Yokohama-Shi (JP)

(72) Inventors: Joelle Mollon, Viroflay (FR); Andreea Balasete, Versailles (FR); Takeshi Watanabe, Atsugi (JP)

(73) Assignees: RENAULT s.a.s., Boulogne Billancourt (FR); NISSAN MOTOR CO., LTD., Yokohama-shi (JP)

( * ) Notice: Subject to any disclaimer, the term of this patent is extended or adjusted under 35 U.S.C. 154(b) by 114 days.

(21) Appl. No.: 14/380,213

(22) PCT Filed: Feb. 20, 2013

(86) PCT No.: PCT/EP2013/053357
§ 371 (c)(1),
(2) Date: Aug. 21, 2014

(87) PCT Pub. No.: WO2013/124303
PCT Pub. Date: Aug. 29, 2013

(65) Prior Publication Data
US 2015/0040861 A1    Feb. 12, 2015

(30) Foreign Application Priority Data
Feb. 21, 2012  (FR) .................................... 12 51580

(51) Int. Cl.
*F02D 31/00* (2006.01)
*B60W 50/029* (2012.01)
(Continued)

(52) U.S. Cl.
CPC .......... *F02D 31/001* (2013.01); *B60W 50/029* (2013.01); *F02D 31/008* (2013.01);
(Continued)

(58) Field of Classification Search
CPC ................... B60W 2710/065; B60W 50/029; F02D 31/008; F02D 41/083; F02D 41/08; F02D 31/001; F02D 41/22; F02D 2041/2058; F02D 2041/227
See application file for complete search history.

(56) References Cited

U.S. PATENT DOCUMENTS 5,054,446 A     10/1991   Ohuchi
5,321,231 A *   6/1994    Schmalzriedt ........ F01N 3/2013
                                                   219/202

(Continued)

FOREIGN PATENT DOCUMENTS

EP        1 958 851        8/2008

OTHER PUBLICATIONS

International Search Report Issued Oct. 30, 2013 in PCT/EP13/053357 Filed Feb. 20, 2013.
(Continued)

*Primary Examiner* — Sizo Vilakazi
(74) *Attorney, Agent, or Firm* — Oblon, McClelland, Maier & Neustadt, L.L.P.

(57) ABSTRACT

In a vehicle including a power supply network for electrical consumers, a battery, an engine, and a generator coupled to the engine to supply electrical energy to the battery and to the power supply network, an operation saving device includes an electronic processor configured to raise an idling speed of the engine when the battery is disconnected from the power supply network.

10 Claims, 4 Drawing Sheets

(51) Int. Cl.
*F02D 41/08* (2006.01)
*F02D 41/22* (2006.01)
*F02D 41/20* (2006.01)

(52) U.S. Cl.
CPC ..... *B60W 2710/065* (2013.01); *F02D 41/083* (2013.01); *F02D 41/22* (2013.01); *F02D 2041/2058* (2013.01); *F02D 2041/227* (2013.01)

(56) References Cited

U.S. PATENT DOCUMENTS

| | | | |
|---|---|---|---|
| 2005/0003710 A1* | 1/2005 | Congdon | F02N 11/0866 439/620.01 |
| 2008/0177444 A1 | 7/2008 | Tachibana et al. | |
| 2009/0255509 A1* | 10/2009 | Sato | F02D 29/06 123/339.2 |
| 2010/0063660 A1 | 3/2010 | Uchida | |
| 2011/0245934 A1* | 10/2011 | Yasuda | G06F 9/52 700/19 |
| 2011/0320079 A1* | 12/2011 | Yasuda | G06F 9/52 701/22 |
| 2012/0217798 A1* | 8/2012 | DeHart | B60L 1/003 307/10.1 |
| 2013/0154281 A1* | 6/2013 | Sullivan | H02J 7/1446 290/40 B |

OTHER PUBLICATIONS

French Search Report Issued Dec. 14, 2012 in French Patent Application No. 1251580 filed Feb. 21, 2012.

\* cited by examiner

METHOD AND DEVICE FOR SAVING THE OPERATION OF A VEHICLE

The invention relates to a device and a method for reducing the impact of a battery disconnection on the operation of a vehicle, in particular a motor vehicle.

Numerous solutions have been studied for overcoming the difficulty in making a vehicle operate when a battery can no longer supply the current required by a power supply network for electrical consumers of the vehicle.

Some known solutions rely on the use of a backup battery as is the case, for example, of the document EP1958851. However, the need for a second battery has the drawback of increasing the weight and the cost of the vehicle.

In order to remedy the problems of the prior art, the subject of the invention is a method for saving the operation of a vehicle comprising a power supply network for electrical consumers, a battery, an engine and a generator coupled to the engine to supply electrical energy to the battery and to the power supply network, characterized in that it comprises a saving step consisting in raising an idling speed of the engine when the battery is disconnected from the power supply network.

In particular, the method comprises a battery disconnected signalling step when the modulus of a current flowing in the battery is below a predetermined threshold.

More particularly, the method comprises a filtering step checking that the modulus of said current flowing in the battery is below the predetermined threshold for a predetermined duration.

Advantageously, the method comprises a disabling step, which consists, when the battery is disconnected from the power supply network, in preventing the triggering of a first function that intrinsically needs to be electrically powered until it is terminated.

Preferably, said first function is an engine stop and start function.

Also advantageously, the method comprises a reinforcing step, which consists, when the battery is disconnected from the power supply network, in increasing the responsiveness of the generator in response to an electrical consumer demand.

The subject of the invention is also a device for saving the operation of a vehicle comprising a power supply network for electrical consumers, a battery, an engine and a generator coupled to the engine to supply electrical energy to the battery and to the power supply network. The device is noteworthy in that it comprises electronic processing means organized to raise an idling speed of the engine when the battery is disconnected from the power supply network.

Specifically, the device comprises a current sensor connected to a battery terminal so as to be able to detect that the battery is disconnected in the absence of current flowing in the battery.

Advantageously, said electronic processing means are organized to prevent the triggering of an engine stop and start function when the battery is disconnected from the power supply network.

Also advantageously, the generator can be controlled so as to increase the responsiveness of the generator in response to an electrical consumer demand when the battery is disconnected from the power supply network.

The invention will be better understood using exemplary embodiments of a device according to the invention with reference to the appended drawings, in which.

Figure 1:
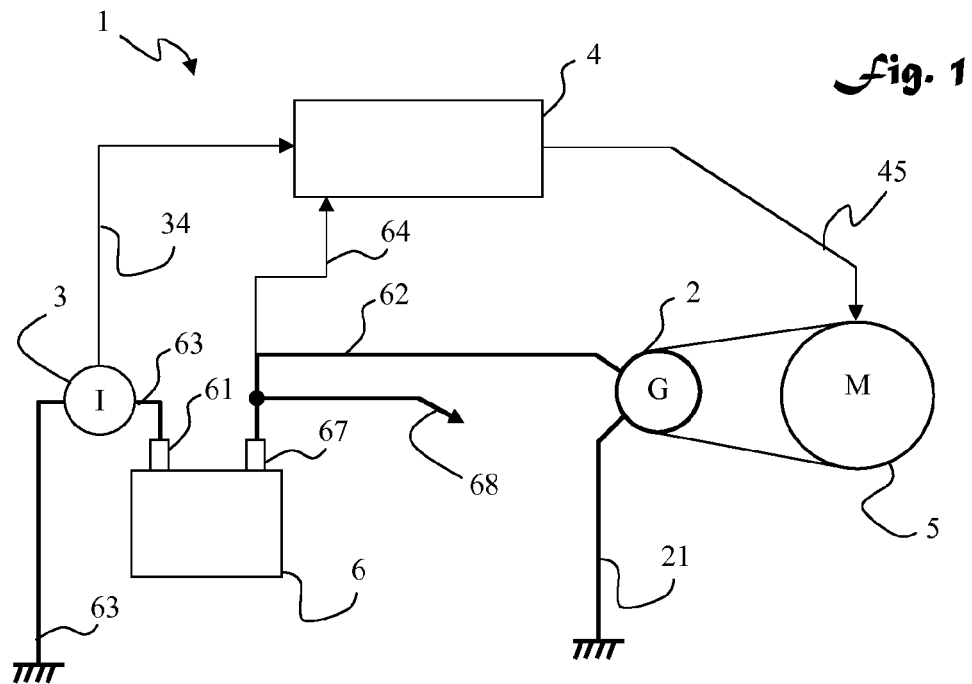
FIG. 1 is a schematic view of a device according to the invention.

FIG. 1 shows vehicle members, in particular of a motor vehicle, comprising a battery 6, an engine 5 and a generator 2 coupled to the engine 5 to supply electrical energy.

The generator 2 is, for example, as is known per se, an alternator comprising an excitation winding and an armature winding which supplies electrical energy according to a magnetic field produced by the excitation winding and an engine 5 rotation speed.

The generator 2 is normally connected on the one hand to a first terminal 67 of the battery 6 by a power electrical conductor 62 and on the other hand to the ground of the vehicle by a power electrical conductor 21. A second terminal 61 of the battery 6 is normally connected to the ground of the vehicle by a power electrical conductor 63. In that way, the electrical energy supplied by the generator 2 can be used to recharge the battery 6.

Electronic processing means 4 are connected to the engine 5 by one or more control electrical conductors 45 to control its rotation speed. For a heat-type engine 5, the electronic means 4 comprise, for example, an engine control unit ECU that drives the ignition of the engine. The electronic processing means 4 are electrically powered by a conductor 64 connected to the terminal 67 of the battery in combination with an electronic ground which is not represented and connected in a manner known per se to the terminal 61 of the battery 6.

The electronic processing means 4 and the excitation winding of the generator 2 constitute electrical consumers of the vehicle.

As is known per se, the vehicle comprises numerous other consumers such as, for example, in a purely illustrative and non-exhaustive manner, a power steering column, windscreen wiping equipment, lighting and signalling equipment, a heat engine starter, and it should be noted that the starter may constitute a common element of or a separate element from the generator 2 depending on whether or not the reversibility of the electric machines is used.

A power supply network for the electrical consumers (not represented) comprises one or more power electrical conductors 68 connected to the electrical conductor 62 that usually links the terminal 67 of the battery to the generator 2 and to the electrical conductor 63 that links the terminal 61 to the ground of the vehicle.

The electrical conductor 63 on the one hand and the set of electrical conductors 62, 64, 68 on the other hand are respectively connected to the terminals 61 and 67 by means of an element clamped onto the terminal. A loosening of the element on any one of the terminals 61, 67 then results in a disconnection of the battery resulting in two effects that are damaging to the operation of the vehicle. The battery 6 disconnected from the generator 2 can no longer be recharged and the electrical consumers disconnected from the battery 6 can no longer be powered by the battery.

To remedy the drawback of the failure of the battery 6 to power the electrical consumers, the cases where the engine 5 is still revolving are exploited by organizing the electronic processing means 4 as follows.

The electronic processing means 4 comprise, in a centralized manner in a single computer or in a distributed manner in a number of computers and electronic circuits of the vehicle, a program comprising computer instructions for executing the method, which will now be explained from FIG. 2.

A switching on of the vehicle and in particular of the electronic processing means 4 places the method in a standby step 200. As long as the battery is normally connected, the method remains in the step 200 without undertaking any particular action.

A signal indicating a battery disconnected state enables a transition 201, which activates a step 202.

The signal indicating the battery disconnected state can be obtained in different ways taken from the state of the art such as, for example, by measurement of voltage ripple at the terminals of the generator 2.

Preference, however, is given to a method consisting in checking the electrical current flowing in the battery.

Figure 2:
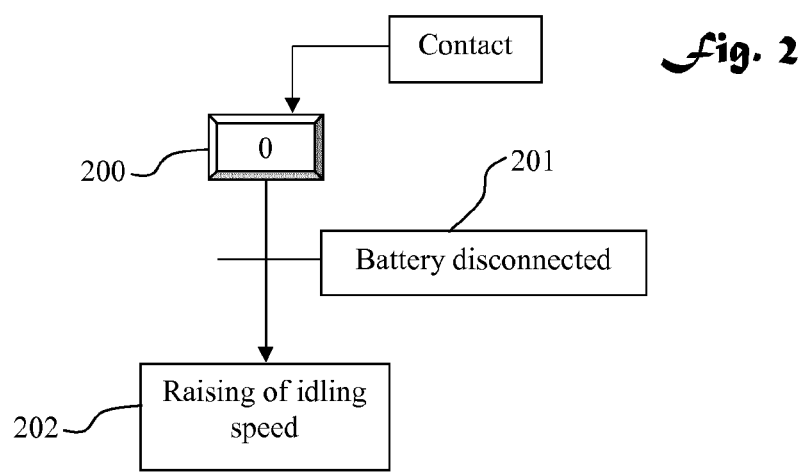
FIGS. 2 and 3 show steps of the method according to the invention.

The device 1 then comprises a current sensor 3 in addition to the electronic processing means 4 organized to implement the method of FIG. 2. The current sensor 3 is connected in series with any one of the terminals 61 or 67 of the battery 6 so as to measure the current I which is flowing in the battery. Numerous tests performed by the inventors have shown that an absence of current flowing in the battery is representative of a disconnection of the battery. In FIG. 1, the current sensor is connected in series to the electrical conductor 63 in immediate proximity to the terminal 61 because the link to the ground is generally simpler than the link to the power supply network for the electrical consumers by the conductors 62, 64, 67. It will, however, be understood that a connection of the sensor 3 to the terminal 67 measures the same electrical current I as in the case where it is connected to the terminal 61.

A measurement conductor 34 connects the current sensor 3 to the electronic processing means 4.

Figure 6:
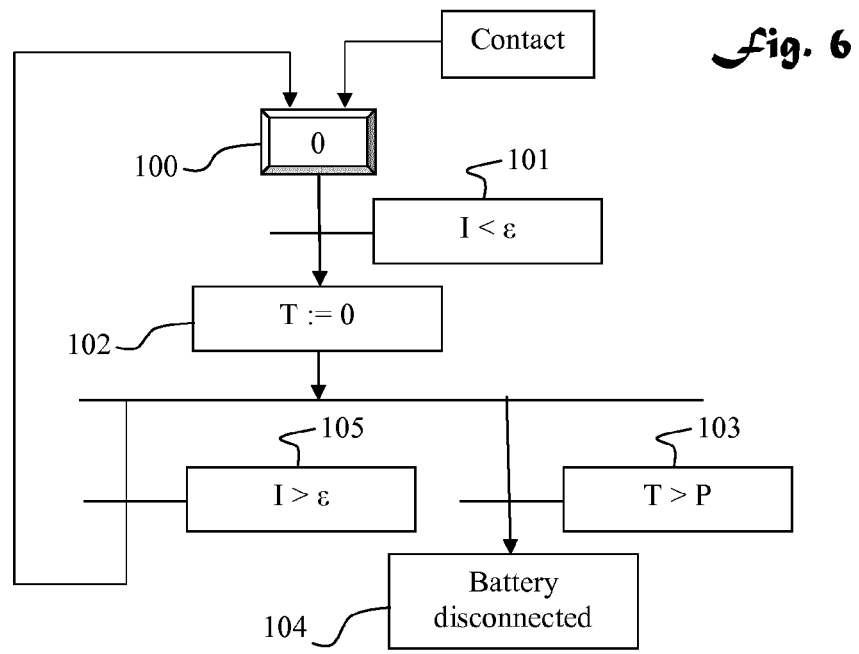
FIG. 6 shows battery disconnected detection steps for implementing the method according to the invention.

The electronic processing means 4 then comprise, here also in a centralized manner in a single computer or in a distributed manner in a number of computers and electronic circuits of the vehicle, computer program instructions for executing the steps of the method, which will now be explained with reference to FIG. 6.

A switching on of the vehicle and in particular of the electronic processing means 4 places a branch of the method in a standby step 100. As long as the battery is normally connected, the method remains in the step 100 during which the current I measured from the sensor 3 is permanently sampled to compare its modulus to a threshold value $\epsilon$.

The current is considered to be zero when its modulus, in other words its absolute value, is below the threshold value $\epsilon$. The comparison performed on the absolute value makes it possible to overcome current variations between positive values corresponding to a discharging of the battery and negative values corresponding to a recharging of the battery. While the battery is connected, the modulus of the current is often corrupted by a noise that can be higher than the threshold value $\epsilon$. The threshold value $\epsilon$ is experimentally determined by tests up to get a good compromise between inopportune detections and a correct sensitivity of detection. The threshold value $\epsilon$ is also predetermined by taking into account the resolution and the accuracy of the sensor 6 according to the definitions that should usually be attributed to these terms. The aim is to be able to distinguish an effectively zero value from an effectively non-zero value of the current allowing for measurement errors within a representative tolerance range. The measurement of the current can also be evaluated as a real value, digital over a link 34 of LIN (Local Interconnect Network) type or analogue over a shielded cable.

As a purely illustrative and non-exhaustive example, on an analogue voltage value varying between 0 and 5 V to retranscribe an electrical current changing between a negative minimum value and a positive maximum value with a zero current value retranscribed to a median voltage value of 2.5 V, a value of $\epsilon$ positioned at 50 mV corresponds to a range of zero values between −1% and +1% full scale. The value of $\epsilon$ can be extended by trial and error to obtain a range of values between +/−5% depending on the degree of desensitization that is desired to avoid unwanted triggerings.

A zero current detection enables a transition 101, which activates a step 102.

The step 102 is particularly useful for a vehicle wherein a zero crossing of the current I flowing through the battery occurs and is measured at the same time with a noise that is lower than the threshold value $\epsilon$, whenever the battery is connected. This can induce an erroneous battery de-connexion detection. So as to assure that the battery de-connexion is real and that an erroneous de-connexion is not detected, the supplementary step 102 is then set up for confirming the battery de-connexion detection corresponding to an absence of current in the battery.

If the detection of absence of current is to be limited only to clear disconnections, preference is given to a triggering of a time delay over a predetermined duration P.

In the latter case, a time variable T is set to zero in the step 102 so as to enable a transition 103 when the variable T exceeds P, thus indicating the expiry of the time delay.

An enabling of the transition 103 activates a battery disconnected signalling step 104 corresponding with a modulus of the current I flowing in the battery below a predetermined threshold, namely below the value $\epsilon$.

Any detection of a current greater as an absolute value than $\epsilon$ is representative of a temporary zero crossing of the current in the step 102, which does not reflect a true disconnection of the battery 6. Such detection then enables a transition 105, which replaces the method in the standby step 100.

The duration P is predetermined by trial and error to obtain a good trade-off between unwanted detection and good detection sensitivity; it can therefore vary from one vehicle architecture to another. The current regularly passes through zero when the battery changes from a charging phase to a discharging phase and vice versa. The current may remain close to zero for a certain time when the charge from the generator 2 balances the current supplied to the consumers without necessarily reflecting a battery disconnection. To give an order of magnitude in a purely illustrative and no limitative manner, the inventors have found that a value of P equal to three seconds would give satisfactory results.

Thus, the current I sensor 3 connected to the battery terminal 61 or 62 is used to measure an absence of current flowing in the battery which makes it possible to detect that the battery 6 is disconnected.

Returning to FIG. 2, the step 202 consists in raising an idling speed of the engine 5.

It will be recalled that the idling speed of the engine, generally expressed in revolutions per minute (RPM), comprises a minimum rotation speed setpoint below which the engine does not fall so as not to stall and to maintain its rotation in order to move off again on the first stress on the accelerator. For this, the heat engine comprises, as is known, a rotation sensor (not represented) and, out of the electronic processing means 4, the computer ECU drives the ignition and the injection of the engine so that it does not fall below said setpoint as long as the contact is not cut.

The idling speed is usually determined as precisely as possible to compensate for the engine losses so as not to consume too much fuel and not to expel too much in the way of poisonous gases to the atmosphere.

The idling speed of the motor 5 may be less stable and less sturdy against disturbances than higher speed of the motor. On the other hand, at idling speed, the maximal power able to be supplied by the generator 2 may not be sufficient to power the most voracious electrical consumers. It is then the battery 6, which supplies the necessary current.

The automatic raising of the rotation speed of the engine 5 at idling speed when the battery 6 is disconnected from the power supply network 63, 68 then makes it possible to increase both the rotation speed and the torque of the engine 5, in other words the power that can be transmitted by the engine 5 to the generator 2. The stability, in other words the sturdiness of the engine against disturbances can be improved. The generator 2 is also more able to supply a power drawn by the electrical consumers by means of the electrical conductor 21 linked to the ground and the electrical conductor 62 linked to the electrical conductor 68.

The new idling setpoint to which the speed is raised is determined for each vehicle type in the design and pre-launch test phase in series production. A power energy budget potentially drawn by the electrical consumers of the vehicle at engine idling speed makes it possible to calculate the electrical power likely to be drawn from the generator 2. The specific curves of torque and/or power as a function of the generator rotation speed then make it possible to determine a minimum rotation speed at which the engine 5 must revolve. Tests allow to determine a good compromise between the fuel consumption of the vehicle and the sturdiness of the engine speed.

As long as the battery 6 is connected, the idling setpoint obviously remains at its usual low value. Thus, the electronic processing means 4 contain in memory at least two idling speed values, a low value to which the electronic processing logic points as long as the battery 6 is connected and a high value to which the electronic processing logic points when the battery 6 is disconnected. The expression "electronic processing" should be understood in its widest sense, in other words applying equally to analogue processing by means of transistors, combinatory processing by means of logic gates in an integrated circuit, and digital processing by means of a computer program stored in memory, for example of the computer ECU or of another computer installed in the vehicle.

Figure 3:
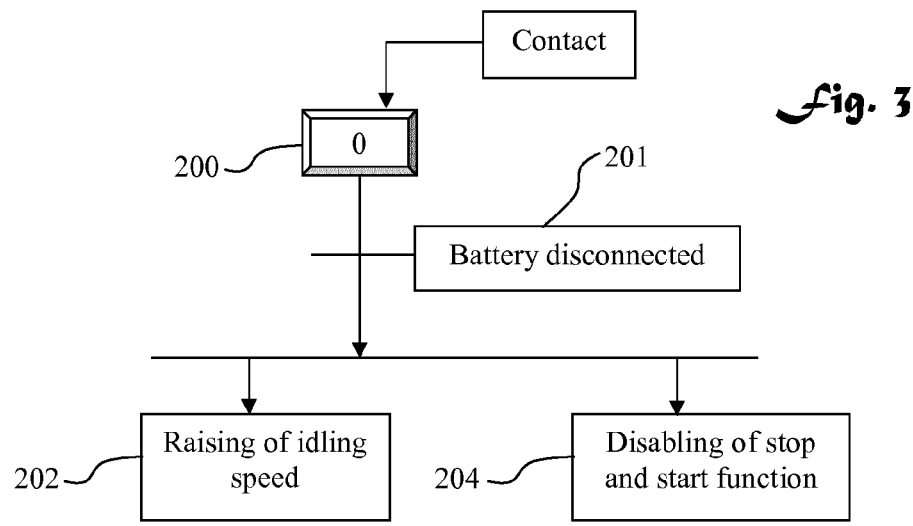

FIG. 3 shows a variant of the method that is particularly advantageous for implementing a heat engine stop and start function.

The transition 201 here activates a disabling step 204 in which the triggering of an engine 5 stop and start function is prohibited. The benefit of this function is usually to be able to stop the heat engine when the vehicle is immobilized to reduce the consumption of fuel and pollution bearing in mind that the vehicle can restart almost immediately upon the first stress on the accelerator, on the clutch or on any other component of the vehicle indicating a willingness of the driver to leave again. In the absence of a battery, the automatic restarting of the heat engine can then not be done. The automatic stop of the heat engine is thus disabled in the absence of a battery. The heat engine continues to revolve as in the absence of a stop and start function. Other functions that have to be electrically powered until they are terminated can be disabled in the step 204.

The stop and start function is generally controlled from the electronic processing means 4 which cut the injection of fuel. One way of implementing the step 204 may, for example, be to deactivate the function so as to organize the electronic processing means 4 to prevent the triggering of the stop and start function of the engine 5 when the battery 6 is disconnected from the power supply network 63, 68.

Figure 4:
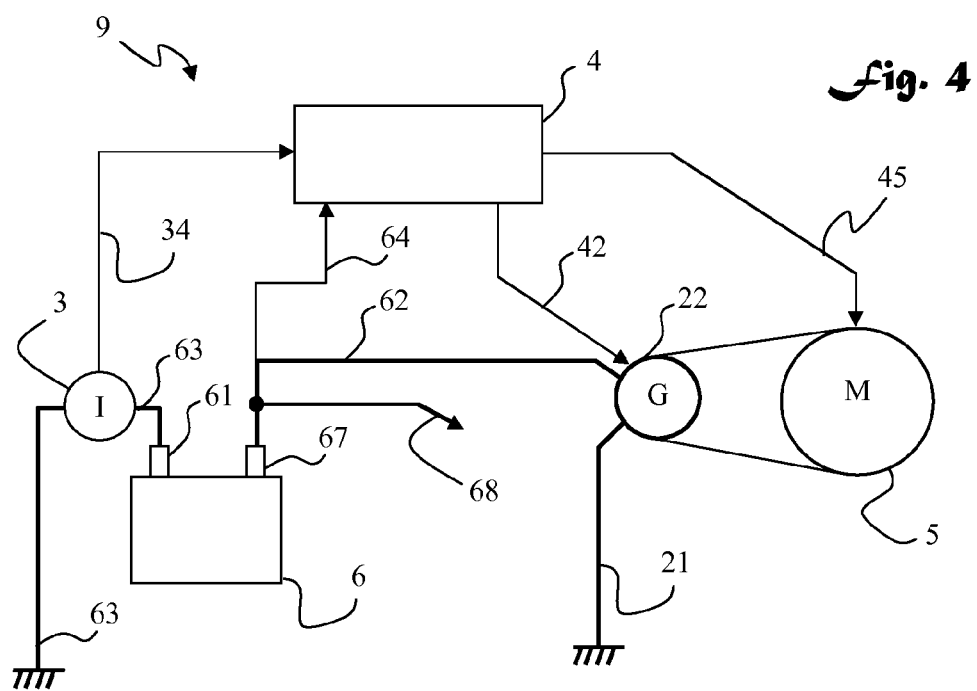
FIG. 4 is a schematic view of another device according to the invention.

FIG. 4 shows a variant embodiment of the device 1 in which a generator 22 is used which can be driven from the electronic processing means 4 by means of a link 42.

The generator 22 may be of the type with internal tension regulation, of the type with external excitation control or of any other type commonly used to optimize the recharging of the battery of a vehicle at the best operating points of the heat engine, for example at high rotation speed, vehicle running, or in the deceleration phase to convert a portion of the kinetic energy of the vehicle into electrical energy.

Preferably, the generator is droved by a tension set point and a ramp set point generated by an external ECU, then communicated to the generator. The droved generator comprises an internal electronic that controls its rotor excitation current to respect the tension set point and the ramp set point. The value of the ramp is given as the necessary time to pass from 0 to 100% of its excitation field. The aim of the ramp is usually to avoid torque jerks resulting on the heat engine 5.

Figure 5:
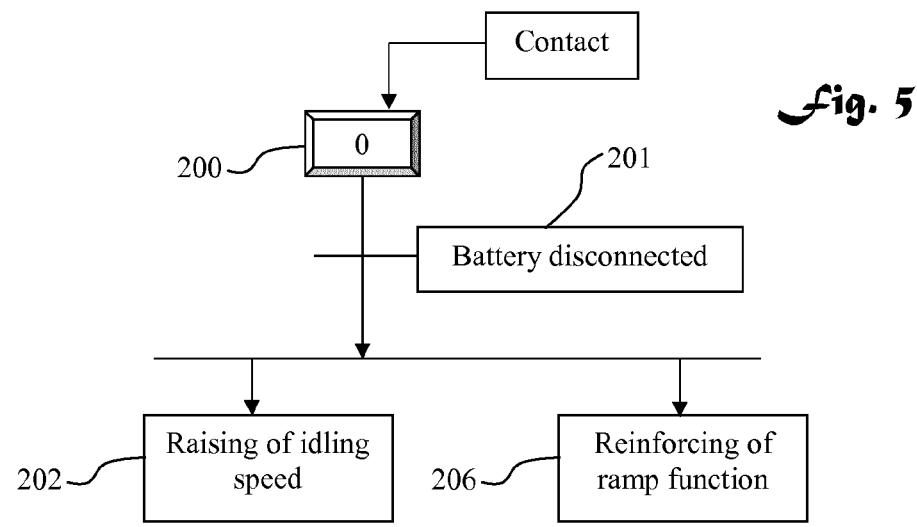
FIG. 5 shows other steps of the method according to the invention.

Particularly advantageously, the generator 22 makes it possible to implement the variant method now explained with reference to FIG. 5.

The transition 201 here activates a reinforcing step 206, which consists in increasing the responsiveness of the generator in response to an electrical consumer demand. The duration $t_P$ is lowered so that the slope of the tension rise ramp is steeper. The duration $t_P$ may possibly be lowered to zero, which is tantamount to applying the tension setpoint in step form to the generator. This makes it possible to increase a greater responsiveness to a growing current demand to respond more rapidly to a need of a consumer.

As long as the battery 6 is connected, the duration $t_P$ obviously remains calculated according to a usual logic comprising generally sixteen values. Thus, the electronic processing means 4 contain in memory at least two duration $t_P$ values, a high value to which the electronic processing logic points as long as the battery 6 is connected and a low, or even zero, value to which the electronic processing logic points when the battery 6 is disconnected.

The step 206 of the method makes it possible to remedy the absence of energy buffer for the power supply network of the vehicle when the battery is disconnected. The high charging response speed which results from the steepness of the slope of the ramp when the duration $t_P$ is low, or even zero, gives a good responsiveness to the generator which thus fights more effectively against the electrical network fluctuations which result from a triggering of an electrical consumer. This makes it possible to maintain a voltage level that is high enough to avoid a reinitialization of the electronic equipment, a defluxing of the generator and a stalling of the heat engine.

Figure 7:
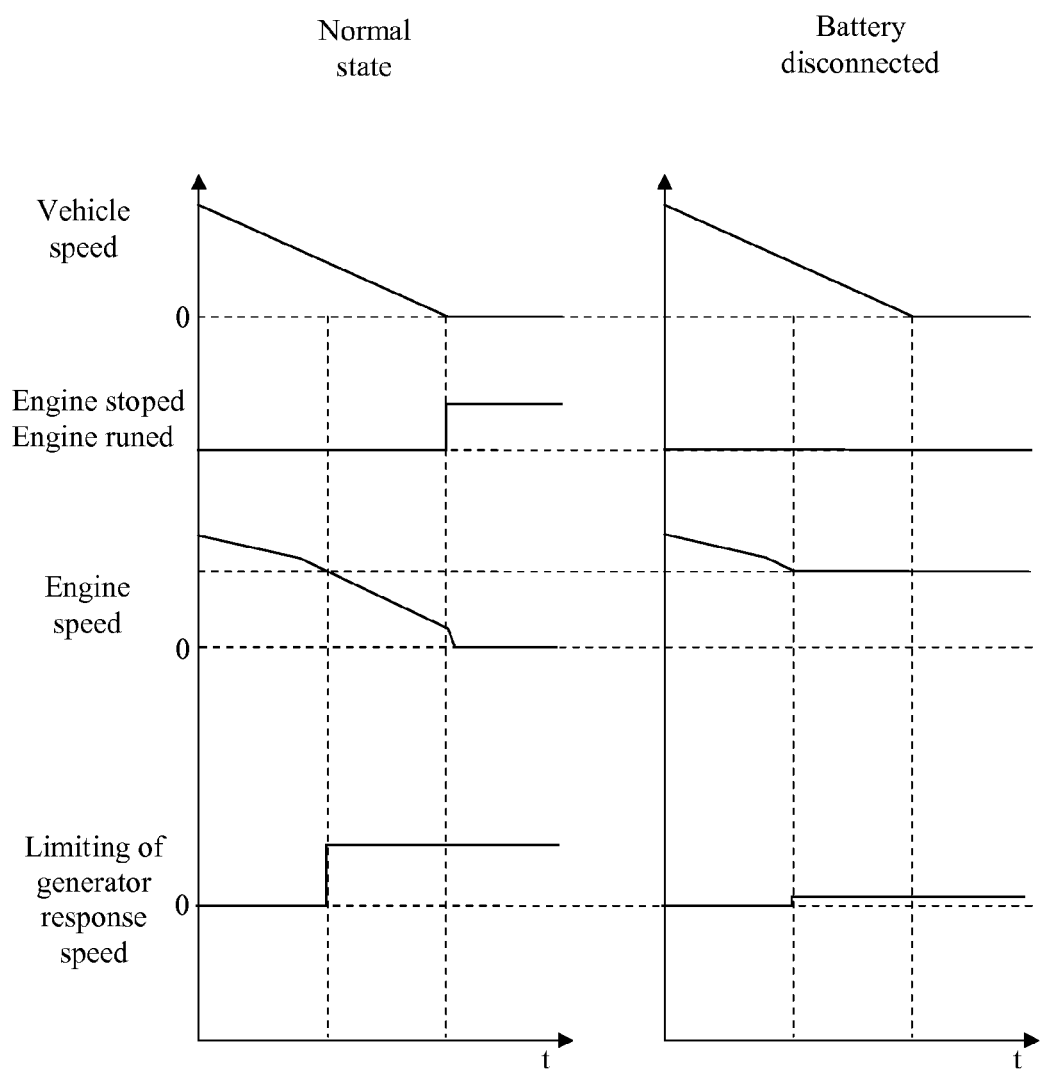
FIG. 7 gives a timing diagram of normal operation and a timing diagram of operation in case of battery failure.

FIG. 7 shows a time trend of essential operating parameters of the vehicle when the steps 202, 204 and 206 are implemented in a common variant of the method. The timing diagram on the left corresponds to a normal battery connected state. The timing diagram on the right corresponds to an abnormal battery disconnected state.

The method is not limited to just the steps described in the embodiment of the method explained above. The implementation of other steps remains within the scope of the present invention.

As an example, in case of battery disconnection, it is possible to desynchronize the normally simultaneous switching on of both the main beams and the dipped beams when the user of the vehicle switches on the headlights. Such a step prevents a voltage drop in the electrical network of the vehicle.

The invention claimed is:

1. A method for saving operation of a vehicle including a power supply network for electrical consumers, a battery, an engine, and a generator coupled to the engine to supply electrical energy to the battery and to the power supply network, the method comprising:
 a saving operation raising an idling speed of the engine when the battery is disconnected from the power supply network.

2. A method according to claim 1, further comprising:
 a battery disconnected signalling when a current flowing in the battery is below in absolute value a predetermined threshold.

3. A method according to claim 2, further comprising:
 a confirmation checking that the current flowing in the battery is below the predetermined threshold for a predetermined duration.

4. A method according to claim 1, further comprising:
 a disabling which, when the battery is disconnected from the power supply network, prevents triggering of a first function that needs to be electrically powered until it is terminated.

5. A method according to claim 4, wherein the first function is an engine stop and start function.

6. A method according to claim 1, further comprising:
 a reinforcing which, when the battery is disconnected from the power supply network, increases responsiveness of the generator in response to an electrical consumer demand.

7. A device for saving operation of a vehicle including a power supply network for electrical consumers, a battery, an engine, and a generator coupled to the engine to supply electrical energy to the battery and to the power supply network, comprising:
 an electronic processor configured to raise an idling speed of the engine when the battery is disconnected from the power supply network.

8. A device according to claim 7, further comprising a current sensor connected to a battery terminal configured to detect that the battery is disconnected in absence of current flowing in the battery.

9. A device according to claim 7, wherein the electronic processor is configured to prevent triggering of an engine stop and start function when the battery is disconnected from the power supply network.

10. A device according to claim 7, wherein the generator is configured to be controlled to increase responsiveness of the generator in response to an electrical consumer demand when the battery is disconnected from the power supply network.

* * * * *